United States Patent [19]
Watanabe

[11] 4,369,978
[45] Jan. 25, 1983

[54] GASKET FOR AIR CONDITIONERS

[75] Inventor: Takeaki Watanabe, Yokohama, Japan

[73] Assignee: Nissan Motor Co., Ltd., Yokohama, Japan

[21] Appl. No.: 187,922

[22] Filed: Sep. 17, 1980

[30] Foreign Application Priority Data

Sep. 19, 1979 [JP] Japan .......................... 54-128491[U]

[51] Int. Cl.³ .......................... B32B 3/22; B32B 5/18; F16J 15/10
[52] U.S. Cl. ...................................... 277/12; 277/228; 277/DIG. 6; 428/57; 428/309.9; 428/318.4
[58] Field of Search .............. 428/57, 311, 315, 309.9, 428/318.4; 277/DIG. 6, 12, 32, 227, 228

[56] References Cited

U.S. PATENT DOCUMENTS

| | | | |
|---|---|---|---|
| 3,160,549 | 12/1964 | Caldwell et al. | 428/40 X |
| 3,173,826 | 3/1965 | Campbell et al. | 428/310 X |
| 3,311,338 | 3/1967 | Culley | 428/354 X |
| 3,380,582 | 4/1968 | Moyer et al. | 428/320 X |
| 3,671,364 | 6/1972 | Guinan | 156/238 X |
| 4,126,966 | 11/1978 | Lobell | 428/315 X |
| 4,169,184 | 9/1979 | Pufahl | 428/311 |
| 4,181,711 | 1/1980 | Ohashi et al. | 428/85 X |

FOREIGN PATENT DOCUMENTS

| | | |
|---|---|---|
| 1525951 | 5/1969 | Fed. Rep. of Germany . |
| 2711399 | 9/1978 | Fed. Rep. of Germany . |
| 803382 | 7/1936 | France . |
| 1271387 | 7/1961 | France . |
| 1582382 | 9/1969 | France . |
| 2141083 | 1/1973 | France . |

Primary Examiner—Robert S. Ward, Jr.
Attorney, Agent, or Firm—Thompson, Birch, Gauthier & Samuels

[57] ABSTRACT

An improved gasket for an air conditioner having at least two separate air conditioning units. The gasket is interposed between the sealing surfaces of the units and comprises a first section of a non-porous material and a second section of a porous foam material. The first section is oriented transverse to the sealing surfaces and the second section is bonded to the first section in a manner of form a unitary, laminated construction. The first section mainly contributes to improving the sealing function of the gasket and the second section which constitutes the major part of the gasket mainly contributes to attaining the required deformability of the gasket.

12 Claims, 5 Drawing Figures

GASKET FOR AIR CONDITIONERS

BACKGROUND OF THE INVENTION

1. Field of the Invention

The present invention relates generally to gaskets for air conditioners, and more specifically to a gasket, in an automotive air conditioner having a plurality of separate air conditioning units, for providing a pressure-tight seal between the units.

2. Description of the Prior Art

In FIG. 1, a typical automotive air conditioner is shown which has a plurality of air conditioning units including a fan unit 1 having a built-in fan 2, a cooling unit 3 having a built-in evaporator 4 and a heater unit 5 having a built-in heater 6. The units are joined together at the joints 7 and 8, with respective gaskets 9 fitted between mating surfaces thereof. Referring to FIG. 2, which is an enlarged sectional view of the joint 8, the gasket 9 is interposed between the sealing surfaces 10 and 11 of the units 3 and 5. The gasket 9 is bonded at one side thereof by a bonding agent 12 to the sealing surface 11 and at the other side forcedly brought into contact with the sealing surface 10, thereby providing a seal between the units 3 and 5. This kind of prior art gasket is usually made of an elastic foam material such as urethane foam so that it is elastic, readily deformable and sufficiently compressible. However, since such a gasket contains numerous pores or interstices, it is somewhat permeable. Leakage of air in an insufficiently conditioned state can therefore occur. Furthermore, water leakage can also occur. That is, when the vehicle body vibrates causing the joints 7 and 8 to vibrate, the pores 13 in the gasket 9 are alternately compressed and expanded. As a result, the gasket 9 effects a pumping action, sucking the water remaining in the air conditioner and pumping it through the gasket to leak out. Thereafter, water leakage continues by capillary action.

For the purpose of eliminating the above drawbacks, there has been proposed a gasket that has been treated with a tar or like substance so that the gasket repells moisture and avoids the pumping effect. However, such a gasket is not wholly satisfactory.

SUMMARY OF THE INVENTION

The gasket according to the present invention comprises a first section of non-porous material and a second section of porous foam material. The first section forms a sheet and is oriented transverse to the sealing surfaces of the air conditioning units, and the second section is bonded to the first section in a manner to form a unitary, laminated construction. With this construction the gasket according to the present invention provides an improved pressure-tight seal between the air conditioning units.

It is an object of the present invention to provide a gasket of the above-mentioned character which provides an improved pressure tight seal while meeting the requirement of being elastic, readily deformable and sufficiently compressible.

It is a further object of the present invention to provide a gasket of the above-mentioned character which permits efficient use of the air conditioner.

It is a yet further object of the present invention to provide a gasket of the above-mentioned character which can be readily applied to current air conditioners without any modification thereto.

It is a yet further object of the present invention to provide a gasket of the above-mentioned character which is simple in construction and inexpensive in manufacturing cost.

BRIEF DESCRIPTION OF THE DRAWINGS

The features and advantages of the gasket according to the present invention will become more clearly appreciated from the following description taken in conjunction with the accompanying drawings in which like reference numerals designate like parts and in which.

DESCRIPTION OF THE PREFERRED EMBODIMENTS

Figure 1:
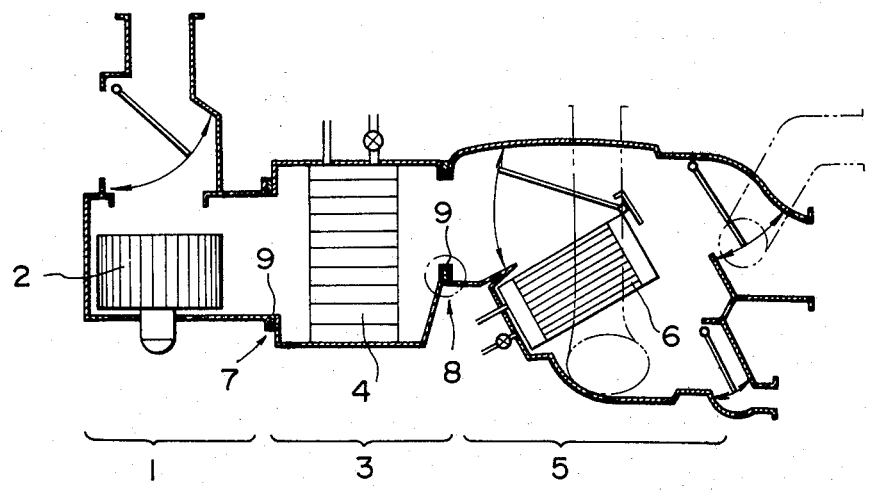
FIG. 1 is a diagrammatic sectional view of a prior art automotive air conditioner having a plurality of separate air conditioning units.
Figure 2:
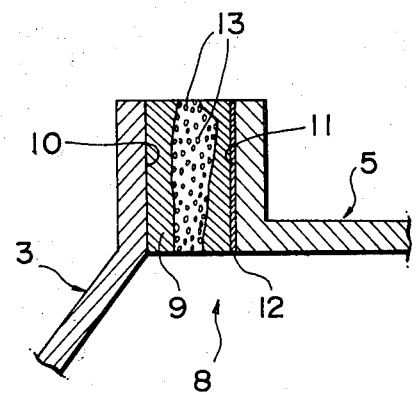
FIG. 2 is an enlarged sectional view of a joint of the air conditioner of FIG. 1.

The present invention will be described hereinbelow as adapted to the joint 8 of the air conditioner of FIG. 1 in place of the gasket 9 for the convenience of illustration and description.

Figure 3:
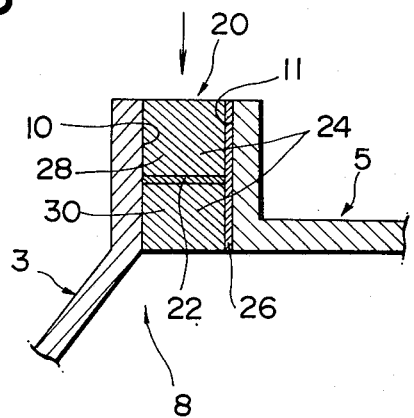
FIG. 3 is a view similar to FIG. 2 showing a gasket according to one embodiment of the present invention.
Figure 4:
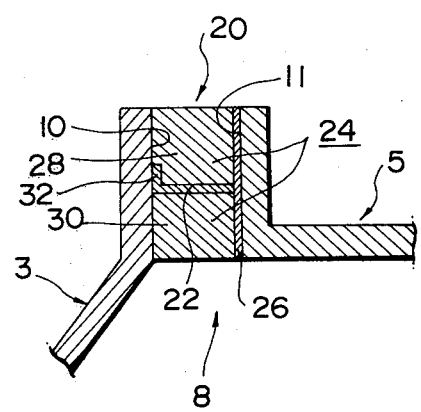
FIGS. 4 and 5 are views similar to FIG. 3 showing modified embodiments according to the present invention.
Figure 5:
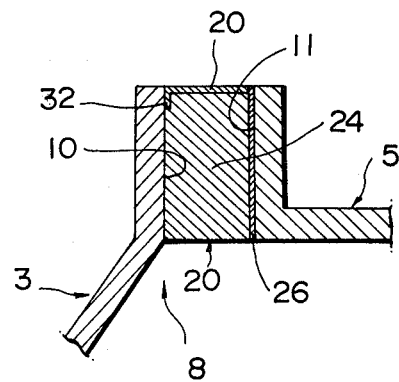

Referring to FIGS. 3 to 5, a gasket 20 for an air conditioner according to the present invention comprises a first section 22 of a non-porous material and a second section 24 of a porous foam material. The first section 22 forms a sheet and is arranged to seal the interior of the air conditioner. That is, the first section 22 is oriented transverse to the sealing surfaces 10 and 11 of the separate air conditioning units 3 and 5. The second section 24 is also shaped and arranged to seal the interior of the air conditioner and is bonded to the first section 22 in a manner to form a unitary, laminated construction. The second section 24 is made of an elastic, readily deformable material such as urethane foam and is bonded at one side thereof to one side 11 of the sealing surfaces by a bonding agent or an adhesive tape 26, and at the other side thereof is forcedly brought into contact with the other sealing surface 10 by utilizing its elasticity.

In the embodiments shown in FIGS. 3 and 4, the second section 24 comprises two separate pieces: an inner piece 28 and an outer piece 30, with the first section 22 interposed therebetween. In the alternative embodiment shown in FIG. 5, the second section 24 comprises only a single piece. In this embodiment, the first section 22 is preferably bonded to the inner side of the second section 24.

In the embodiments shown in FIGS. 4 and 5, the first section 22 also includes a tab end 32 adjacent the sealing surface 10 and is bonded at the tab end to the sealing surface. The first section 22 is made of a thin, pliable strip so that the gasket 20 is elastic, readily deformable and sufficiently compressible. In the embodiments shown in FIGS. 3 and 4, the first section 22 preferably comprises a layer of bonding agent or a double-faced adhesive tape which is impermeable to both air and water. In the embodiment shown in FIG. 5, the first section 22 preferably comprises a single-faced adhesive tape which is impermeable to both air and water.

In operation, the gasket 20 can provide an excellent pressure-tight seal between the units 3 and 5 since the first section 22 made of a non-porous material completely prevents leakage of air and water. The first section with the tab end 32 is more effective in this regard, in that the tab end is bonded to the sealing surface 10. Furthermore, a more assured fluid-tight seal can be obtained by the modified first section including an additional layer or layers for further enclosing the interior of the air conditioner. The gasket 20 is elastic, readily deformable and sufficiently compressible since the second section 24 comprising the most part of the gasket is made of an elastic porous material and the first section is made of a thin, pliable strip.

In the foregoing, the term "air conditioner" is intended to encompass not only a device having only a cooling function, but also devices having both cooling and heating functions.

From the foregoing, there has been provided an improved gasket for air conditioners calculated to fulfil the objects set forth.

Obviously, many variations and modifications of the present invention are possible in light of the above teachings. It is, therefore, to be understood that within the scope of the appended claims the invention may be practiced otherwise than as specifically described.

What is claimed is:

1. In an air conditioner including at least two separate air conditioning units, a gasket interposed between the sealing surfaces of said units, said gasket comprising a first section of a non-porous material oriented transverse to said sealing surfaces and a second section of a porous foam material bonded to said first section in a manner to form a unitary, laminated construction.

2. A gasket as claimed in claim 1, wherein said second section comprises two separate pieces, and wherein said first section is interposed therebetween.

3. A gasket as claimed in claim 1, wherein said second section comprises a single piece, and wherein said first section is bonded to a side thereof.

4. A gasket as claimed in claim 1, wherein said second section is bonded to one of said sealing surfaces.

5. A gasket as claimed in claim 4, wherein said first section further comprises a tab end adjacent the other sealing surface and is secured at said tab end to said other sealing surface.

6. A gasket as claimed in claim 1, wherein said first section comprises a thin, pliable strip.

7. A gasket as claimed in claim 6, wherein said first section comprises a double-faced adhesive tape.

8. A gasket as claimed in claim 6, wherein said first section comprises a single-faced adhesive tape.

9. A gasket as claimed in claim 6, wherein said first section comprises a layer of bonding agent.

10. A gasket as claimed in claim 1, wherein said second section comprises an elastic, readily deformable material.

11. A gasket as claimed in claim 10, wherein said second section comprises two pieces of urethane foam.

12. A gasket as claimed in claim 10, wherein said second section comprises a piece of urethane foam.

* * * * *